United States Patent
Mi et al.

(10) Patent No.: US 10,951,640 B2
(45) Date of Patent: Mar. 16, 2021

(54) TRAFFIC ATTACK PROTECTION METHOD AND SYSTEM, CONTROLLER, ROUTER, AND STORAGE MEDIUM

(71) Applicant: TENCENT TECHNOLOGY (SHENZHEN) COMPANY LIMITED, Shenzhen (CN)

(72) Inventors: Penghui Mi, Shenzhen (CN); Sujian Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 132 days.

(21) Appl. No.: 16/250,438

(22) Filed: Jan. 17, 2019

(65) Prior Publication Data

US 2019/0173901 A1 Jun. 6, 2019

Related U.S. Application Data

(63) Continuation of application No. PCT/CN2017/101512, filed on Sep. 13, 2017.

(30) Foreign Application Priority Data

Oct. 31, 2016 (CN) .......................... 201610934282.1

(51) Int. Cl.
*H04L 29/06* (2006.01)
*H04L 12/715* (2013.01)
(Continued)

(52) U.S. Cl.
CPC ........ *H04L 63/1425* (2013.01); *H04L 41/142* (2013.01); *H04L 43/04* (2013.01);
(Continued)

(58) Field of Classification Search
CPC ............. H04L 63/0807; H04L 63/0884; H04L 63/101; H04L 63/102; H04L 63/20; G06F 9/451
See application file for complete search history.

(56) References Cited

U.S. PATENT DOCUMENTS 7,680,876 B1 * 3/2010 Cioli ................... G06F 11/1662
709/201
9,832,118 B1 * 11/2017 Miller ................. H04L 63/0272
(Continued)

FOREIGN PATENT DOCUMENTS

| CN | 101383812 A | 3/2009 | |
| CN | 104104669 A * | 10/2014 | ......... H04L 63/1425 |

(Continued)

OTHER PUBLICATIONS

The World Intellectual Property Organization (WIPO) International Search Report for PCT/CN2017/101512 dated Nov. 30, 2017 6 Pages (including translation).

*Primary Examiner* — Ali S Abyaneh
*Assistant Examiner* — Shu Chun Gao
(74) *Attorney, Agent, or Firm* — Anova Law Group, PLLC

(57) ABSTRACT

A method for protection against cyberattack includes: establishing neighbor relationships with border routers at a plurality of traffic entrances; and receiving an attack protection request from an intrusion detection system at a first traffic entrance. The first traffic entrance is any one of the plurality of traffic entrances. The attack protection request carries a target network address that has been attacked. The method also includes: generating routing information based on the attack protection request, and sending the routing information to a first border router based on the neighbor relationships. The routing information includes the target network address and routing address information. The first border (Continued)

router performs, based on the routing address information, protection processing on traffic that corresponds to the target network address. The first border router is a border router at the first traffic entrance at which the intrusion detection system that sends the attack protection request is located.

20 Claims, 8 Drawing Sheets

(51) Int. Cl.
    *H04L 12/26*     (2006.01)
    *H04L 12/751*     (2013.01)
    *H04L 12/24*     (2006.01)

(52) U.S. Cl.
    CPC ............ *H04L 43/106* (2013.01); *H04L 45/02* (2013.01); *H04L 45/04* (2013.01); *H04L 63/0227* (2013.01); *H04L 63/1416* (2013.01); *H04L 63/1441* (2013.01)

(56) References Cited

U.S. PATENT DOCUMENTS

| | | | |
|---|---|---|---|
| 10,516,586 B2* | 12/2019 | Gandham | H04L 69/16 |
| 2003/0093691 A1* | 5/2003 | Simon | H04L 63/0428 |
| | | | 726/4 |
| 2005/0076246 A1* | 4/2005 | Singhal | H04L 63/0823 |
| | | | 726/4 |
| 2010/0218250 A1 | 8/2010 | Mori et al. | |
| 2016/0248806 A1* | 8/2016 | Smith | H04L 45/021 |
| 2016/0261486 A1 | 9/2016 | Fang et al. | |
| 2017/0272465 A1* | 9/2017 | Steele | H04L 63/107 |

FOREIGN PATENT DOCUMENTS

| | | |
|---|---|---|
| CN | 104104669 A | 10/2014 |
| CN | 204013604 U | 12/2014 |

* cited by examiner

TRAFFIC ATTACK PROTECTION METHOD AND SYSTEM, CONTROLLER, ROUTER, AND STORAGE MEDIUM

RELATED APPLICATIONS

This application is a continuation application of PCT Patent Application No. PCT/CN2017/101512, filed on Sep. 13, 2017, which claims priority to Chinese Patent Application No. 201610934282.1, entitled "TRAFFIC ATTACK PROTECTION METHOD, CONTROL APPARATUS, AND PROCESSING APPARATUS AND SYSTEM" filed with the Chinese Patent Office on Oct. 31, 2016, the entire contents of both of which are incorporated herein by reference.

FIELD OF TECHNOLOGY

The present disclosure relates to the field of network security technologies, and specifically, to a traffic attack protection method, a controller, a border router, a storage medium, and a traffic attack protection system.

BACKGROUND OF THE DISCLOSURE

With the development of Internet technologies and the popularity of applications, a multi-service system on a network faces an increasing number of more complex network attack behaviors. A distributed denial of service (DDoS) is a relatively serious network attack behavior. In the DDoS, a system is attacked by a large quantity of puppet machines at the same time. Consequently, the attacked system cannot support normal service access due to reasons such as bandwidth congestion or resource depletion of a server.

SUMMARY

Embodiments of the present disclosure provide a traffic attack protection method and system, a controller, a border router, and a storage medium.

An embodiment of the present disclosure provides a method for protection against cyberattack. The method includes: establishing, by a controller, neighbor relationships with border routers at a plurality of traffic entrances; and receiving, by the controller, an attack protection request sent by an intrusion detection system at a first traffic entrance. The first traffic entrance is any one of the plurality of traffic entrances, and the attack protection request carries a target network address that has been attacked. The method also includes: generating, by the controller, routing information based on the attack protection request. The routing information includes the target network address and routing address information. The method also includes sending the routing information to a first border router based on the neighbor relationships, so that the first border router performs, based on the routing address information, protection processing on traffic that corresponds to the target network address. The first border router is a border router at the first traffic entrance at which the intrusion detection system that sends the attack protection request is located.

Correspondingly, an embodiment of the present disclosure further provides a traffic attack protection and control apparatus. The apparatus can be integrated on a controller, and the apparatus or the controller includes: one or more memories; and one or more processors. The one or more processors are configured to: establish neighbor relationships with border routers at a plurality of traffic entrances; and receive an attack protection request sent by an intrusion detection system at a first traffic entrance. The first traffic entrance is any one of the plurality of traffic entrances. The attack protection request carries a target network address that has been attacked. The one or more processors are also configured to generate routing information based on the attack protection request. The routing information includes the target network address and routing address information. The one or more processors are also configured to send the routing information to a first border router based on the neighbor relationships, so that the first border router performs, based on the routing address information, protection processing on traffic that corresponds to the target network address. The first border router is a border router at the first traffic entrance at which the intrusion detection system that sends the attack protection request is located.

Correspondingly, an embodiment of the present disclosure further provides a traffic attack protection and processing apparatus. The apparatus can be integrated on a border router, and the protection and processing apparatus or the border router includes: one or more memories; and one or more processors. The one or more processors are configured to establish a neighbor relationship with a controller. The controller has neighbor relationships established with a plurality of the border routers at a plurality of traffic entrances. The one or more processors are also configured to receive, based on the neighbor relationship, routing information that is sent by the controller. The routing information includes the target network address and routing address information. The one or more processors are also configured to perform, based on the routing information, protection processing on the traffic that corresponds to the target network address.

An embodiment of the present disclosure further provides a traffic attack protection system. The traffic attack protection system includes any protection and control apparatus (or the controller) provided in the embodiments of the present disclosure or any protection and processing apparatus (or the border router) provided in the embodiments of the present disclosure.

An embodiment of the present disclosure further provides a non-volatile computer-readable storage medium, the non-volatile computer-readable storage medium storing a computer-readable instruction, so that at least one processor can perform the foregoing methods.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons skilled in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons skilled in the art based on the embodiments of the present disclosure without creative efforts shall fall within the protection scope of the present disclosure.

The embodiments of the present disclosure provide a traffic attack protection method, a control apparatus, and a processing apparatus and a system. Traffic attack protection, as used herein, may refer to protection against cyberattack, especially attacks related to network traffic, such as DoS (denial of service) attack or DDoS (distributed denial of service) attack.

The traffic attack protection system may include any traffic attack protection and control apparatus and any traffic attack protection and processing apparatus that are provided in the embodiments of the present disclosure. The protection and control apparatus may be integrated into a device such as a controller, for example, may be integrated into a software defined networking (SDN) controller, and the protection and control apparatus may further be integrated into a member controller of a controller cluster or a master control device. The protection and processing apparatus may be integrated into a router, for example, a border router at a traffic entrance. The SDN controller can support concurrent processing of multiple attack protection requests from one or more intrusion detection systems (e.g., generate routing information and sending to the corresponding border router).

Figure 1A:
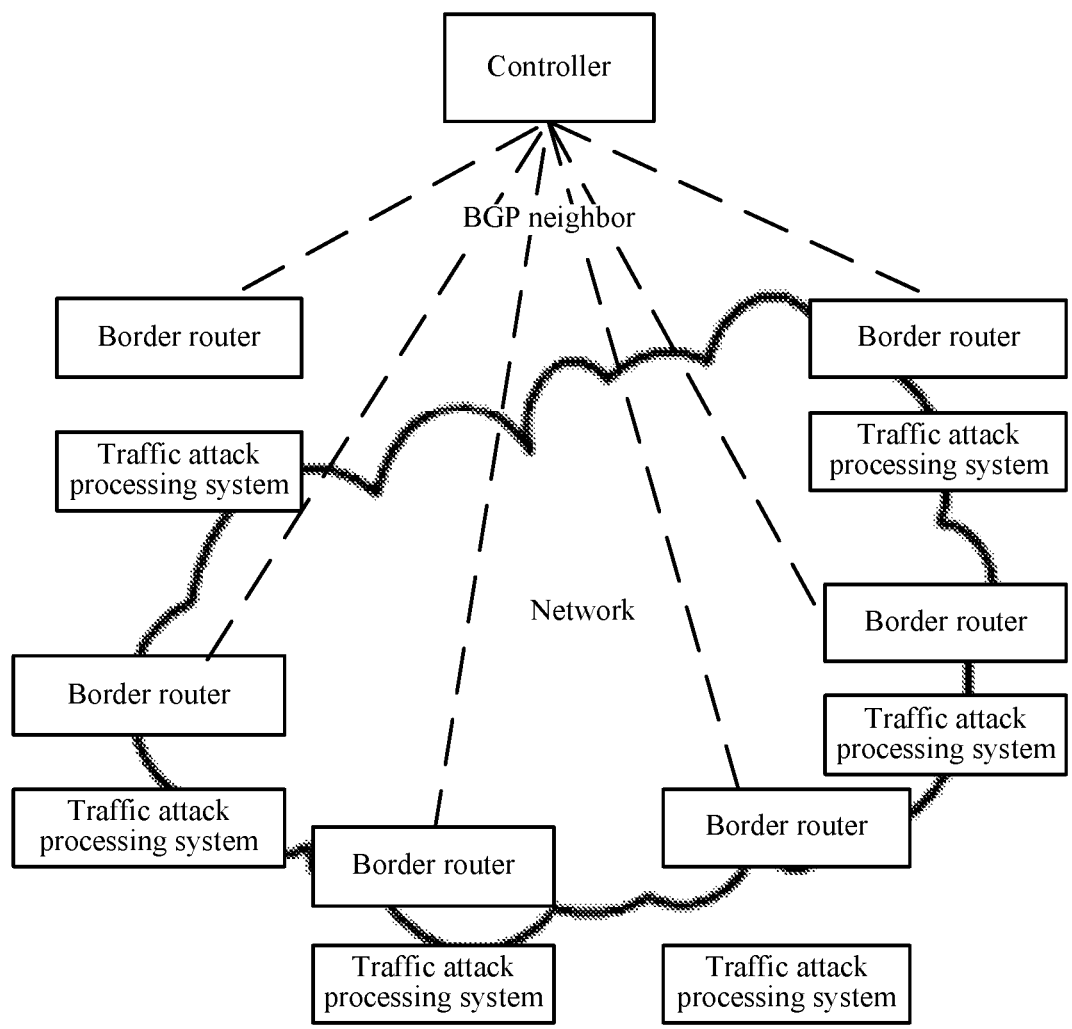
FIG. 1a is a schematic diagram of a scenario of a traffic attack protection system according to an embodiment of the present disclosure.

That the protection and control apparatus is integrated into a controller and the protection and processing apparatus is integrated into a border router is used as example. As shown in FIG. 1a, the traffic attack protection system includes controllers and border routers at traffic entrances. The border routers may be located in a same network such as a same backbone network.

In addition, referring to FIG. 1a, the traffic attack protection system may further include a traffic attack processing system at each traffic entrance. The traffic attack processing system may be a DDoS cleaning system and the like. A border router and a traffic attack processing system can be deployed at each traffic entrance of the traffic attack protection system, to implement traffic attack protection.

When the traffic attack protection needs to be performed, the controller is configured to: establish a neighbor relationship with a border router at a traffic entrance; receive an attack protection request that is sent by an intrusion detection system at the traffic entrance, the attack protection request carrying a target network address that has been attacked; generate corresponding routing information based on the attack protection request, the routing information including the target network address and routing address information; and send the routing information to the border router based on the neighbor relationship, so that the border router performs, based on the routing information, protection processing on the traffic that corresponds to the target network address. The attack protection request may include a traffic filtering request, or a traffic blocking request, or another type of protection request.

The border router in the traffic attack protection system may be configured to: establish a neighbor relationship with a controller; receive, based on the neighbor relationship, routing information that is sent by the controller, the routing information including routing address information and a target network address that has been attacked; and perform, based on the routing information, protection processing on the traffic that corresponds to the target network address. The border router may filter or discard, based on the routing information, the traffic that corresponds to the target network address.

For example, the border router may redirect, based on the routing information, the traffic that corresponds to the target network address to the traffic attack processing system. In this case, the traffic attack processing system may be configured to filter the traffic that corresponds to the target network address, and returns the filtered traffic to the border router. After receiving the filtered traffic, the border router may return the traffic to a data center.

Detailed descriptions are provided below separately.

In some embodiments, descriptions are made from a perspective of a traffic attack protection apparatus. The protection apparatus may perform traffic attack protection and control, and therefore may also be referred to as a traffic attack protection and control apparatus. The protection and control apparatus may be integrated into a controller, for example, may be integrated into an SDN controller.

A traffic attack protection method, including: establishing, by a controller (e.g., a single controller or a controller cluster/group), a neighbor relationship with a first border router at a first traffic entrance; receiving an attack protection request that is sent by an intrusion detection system at the first traffic entrance, the attack protection request carrying a target network address that has been attacked; generating routing information based on the attack protection request, the routing information including the target network address and routing address information; and sending the routing information to the first border router based on the neighbor relationship, so that the first border router performs, based on the routing information, protection processing on the traffic that corresponds to the target network address. As shown in FIG. 1a, the controller may establish neighbor relationships with a plurality of border routers at a plurality of traffic entrances. The first traffic entrance may be any one of the plurality of traffic entrances.

Figure 1B:
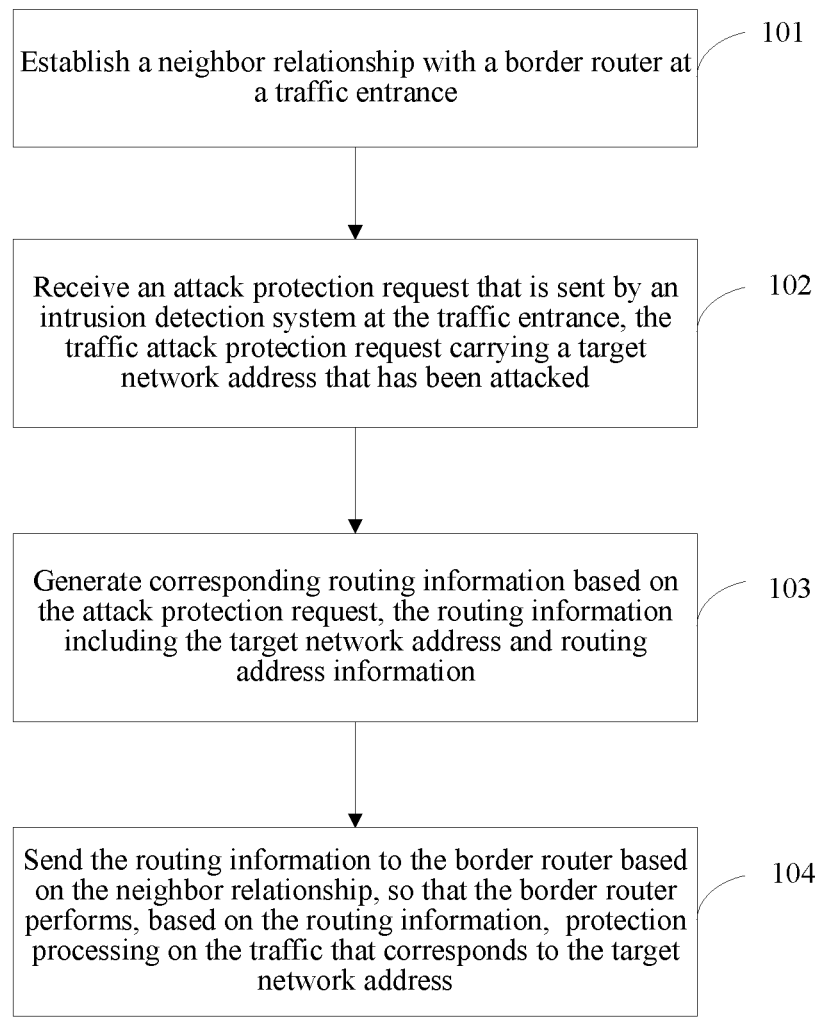
FIG. 1b is a schematic flowchart of a traffic attack protection method according to an embodiment of the present disclosure.

As shown in FIG. 1b, a specific procedure of a traffic attack protection method may be as follows.

101. Establish a neighbor relationship with a border router at a traffic entrance.

It may be understood that, a neighbor relationship may be established with border routers at one or more traffic entrances. For example, referring to FIG. 1a, a controller establishes a BGP neighbor relationship with a plurality of border routers on a network.

Specifically, a neighbor relationship may be established with a border router at a traffic entrance based on a routing protocol.

The routing protocol may be a border gateway protocol (BGP), the BGP being a routing protocol used for dynamically exchanging routing information between autonomous systems, or may be an internal border gateway protocol (iBGP), and the iBGP being one of a BGP relationship and existing between routers in a same autonomous system. The iBGP is used for transmitting routing information between the routers by using a BGP protocol.

In this case, an iBGP neighbor relationship may be established with the border router based on an iBGP protocol.

Specifically, the step "establishing a neighbor relationship with a border router at a traffic entrance" may include:

sending a neighbor relationship establishment request to a border router at a traffic entrance;

receiving response information that is returned by the border router based on the neighbor relationship establishment request; and establishing a neighbor relationship based on the response information.

102. Receive an attack protection request that is sent by an intrusion detection system at the traffic entrance, the attack protection request carrying a target network address that has been attacked.

Because the controller may establish a neighbor relationship with a plurality of border routers, traffic attack protection requests sent by intrusion detection systems at a plurality of traffic entrances may be received. In the step, the controller may receive an attack protection request that is sent by an intrusion detection system at any one of the one or more traffic entrances. When the attack protection request that is sent by the intrusion detection system at any traffic entrance is received, the follows steps are performed. Therefore, step S102 may be described as "receiving an attack protection request that is sent by an intrusion detection system at any one of the one or more traffic entrances, the attack protection request carrying a target network address that has been attacked".

Specifically, the attack protection request sent by the intrusion detection system at the traffic entrance may be received by using a northbound representational state transfer (Restful) interface.

The target network address may be a network address of which traffic suffers DDoS attack. The target network address may be an Internet Protocol (IP) address, for example, 1.2.3.4/32.

In one embodiment, the attack protection request is sent by an IDS. Specifically, the IDS performs attack traffic analysis and detection on network traffic of a network address, and sends a corresponding traffic attack protection request to the traffic control and protection apparatus based on a detection result.

There may be a plurality of types of traffic attack protection requests. For example, the attack protection request may include: a traffic filtering (or cleaning) request, or a traffic blocking (or discarding) request. For example, when detecting that attack traffic of an IP is less than a preset threshold, the IDS sends a traffic cleaning request to a traffic control and protection apparatus. When detecting that attack traffic of an IP is greater than a preset threshold, the IDS sends a traffic blocking request to a traffic control and protection apparatus.

103. Generate corresponding routing information based on the attack protection request, the routing information including the target network address and routing address information.

For example, corresponding iBGP routing information may be generated based on the attack protection request. The target network address can be included as a prefix of the routing information, and the target network address may represent/indicate routing (e.g., routing path or router) to which the routing information correspond.

The routing address information may be routing address information that corresponds to the target network address, for example, may include a next-hop address. The next-hop address may also be named as next-hop routing address. The next-hop address may be an address of a device or system that is directly connected to the border router, for example, an interface address of a device or a system that is directly connected to the border router. That is, the next-hop address is an interface address of a next device or system that traffic of the target network address needs to reach by using the border router.

For example, when the next-hop address is an address of a device H, the border router sends traffic of a target IP to the device H.

Specifically, the step "generating corresponding routing information based on the attack protection request" may include:

parsing the attack protection request to obtain the target network address;

setting a next-hop address that corresponds to the target network address; and generating corresponding routing information based on the target network address and the next-hop address, the routing information including the target network address and the next-hop address.

In one embodiment, for different types of traffic attack protection requests, set next-hop addresses are different. Specifically:

When the attack protection request is a traffic filtering request, because the traffic needs to be filtered or cleaned, it may be set that the next-hop address points to a traffic attack processing system (for example, a DDoS cleaning system). The DDoS cleaning system may filter and/or redirect network traffic to protect legitimate traffic and/or discard ill-purposed requests. In this case, the next-hop address may be an address or an interface address of the traffic attack processing system (for example, the DDoS cleaning system). In this way, the border router may divert, after receiving routing information, the traffic of the target network address to the traffic attack processing system to filter or clean the traffic.

For example, when the address of the DDoS cleaning system is 2.2.2.2, it may be set that the next-hop address is 2.2.2.2.

When the attack protection request is a traffic blocking request, because traffic needs to be sealed or discarded, it may be set that the next-hop address points to null, that is, Null0. For example, it may be set that the next-hop address points to a null interface. In this way, the border router may discard the traffic of the target network address after receiving the routing information, to implement traffic blocking.

During actual application, it may be preconfigured that an address points to a null interface. In this case, the address may be set to a next-hop address. For example, when the border router preconfigures that an address 10.10.10.10 points to Null0, it may be set that the next-hop address is the address 10.10.10.10.

104. Send the routing information to the border router based on the neighbor relationship, so that the border router performs, based on the routing information, protection processing on the traffic that corresponds to the target network address.

Because traffic attack protection requests sent by intrusion detection systems at a plurality of traffic entrances may be received, routing information generated for each request needs to be sent to a border router at the traffic entrance at which the intrusion detection system that sends the request is located. Therefore, the step may be described as "sending the routing information to a corresponding border router based on the neighbor relationship, so that the corresponding border router performs, based on the routing address information, protection processing on traffic that corresponds to the target network address, the corresponding border router being a border router at the traffic entrance at which the intrusion detection system that sends the attack protection request is located". For example, an intrusion detection system at a traffic entrance A sends an attack protection request to a controller. When the controller generates routing information based on the request, the routing information is sent to a border router at the traffic entrance A instead of a border router at another traffic entrance.

For example, the border router is notified of iBGP routing information based on the neighbor relationship, and the iBGP routing information may include a target IP and a next-hop address.

Specifically, when the attack protection request includes a traffic filtering request, and the next-hop address points to a traffic attack processing system, the border router may be notified of the routing information based on the neighbor relationship, so that the border router diverts/redirects, based on the routing information, the traffic that corresponds to the target network address to the traffic processing system (that is, the traffic attack processing system) to perform traffic filtering processing. For example, for the traffic filtering request that is sent by the intrusion detection system at the traffic entrance A, the next-hop address generated by the controller is a traffic attack processing system A to which the border router at the traffic entrance A is connected. Therefore, after the controller sends the routing information to the border router at the traffic entrance A, the border router diverts the traffic that corresponds to the target network address to the traffic attack processing system A to which the border router is connected.

When the attack protection request includes a traffic blocking request, and the next-hop address points to a null interface, the routing information is sent to the border router based on the neighbor relationship, so that the border router discards, based on the routing information, the traffic that corresponds to the target network address.

It may be understood that, the so-called discarding is actually sending the traffic that corresponds to the target network address to an address to which the next-hop address points. Because the address is a null interface, the traffic that corresponds to the target network address may be discarded. Therefore, that the routing information is sent to the border router based on the neighbor relationship, so that the border router discards, based on the routing information, the traffic that corresponds to the target network address may also be described as "sending the routing information to the corresponding border router based on the neighbor relationship, so that the corresponding border router sends, based on the routing information, the traffic that corresponds to the target network address to the null interface".

Optionally, considering that traffic that corresponds to the target network address may exist in the border router, to improve a success rate and applicability of traffic attack protection, already existing local router that corresponds to the target network address needs to be covered. Specifically, the already existing local router may be covered by setting a preference. For example, it may be set that a preference of the routing information is higher than that of local routing information that corresponds to a target network address in a border router. That is, the routing information in some embodiments may further include the preference that corresponds to the routing information. The preference that corresponds to the routing information is higher than a preference of local routing information in the border router, and the local routing information may be the local routing information that corresponds to the target network address in the border router.

In this case, the step "generating corresponding routing information based on the target network address and the next-hop address" may include:

obtaining a preference of to-be-generated routing information, the preference being higher than a preference of local routing information in a border router; and generating corresponding routing information based on the preference, the target network address, and the next-hop address, the routing information including the target network address, the preference of the routing information, and the next-hop address.

It can be learned from above that in embodiments of the present disclosure, the neighbor relationship is established with the border router at the traffic entrance; the attack protection request that is sent by the intrusion detection system at the traffic entrance is received, the attack protection request carrying a target network address that has been attacked; the corresponding routing information is generated based on the attack protection request, the routing information including the target network address and the routing address information; and the routing information is sent to the border router based on the neighbor relationship, so that the border router performs, based on the routing information, the protection processing on the traffic that corresponds to the target network address. In this solution, because the neighbor relationship can be directly established with the border router, and the routing information can be sent to the border router, the traffic attack protection and control is implemented. On the one hand, in the solution, a network function module can be stripped from the traffic cleaning system, to simplify the traffic cleaning system and improve stability and maintenance of the traffic attack protection system. On the other hand, in the solution, traffic protection can be implemented by controlling the border router without depending on a network management system, thereby reducing demands on an intermediate module and attack caused to a CPU of a device in a short time period with frequent attacks, and improving time validity and reliability of the traffic attack protection system.

In addition, in the solution provided in the embodiment of the present disclosure, traffic is prevented from being sealed by configuring black-hole route. Therefore, efficiency and a success rate of traffic attack protection are improved, and costs and a difficulty degree of system operation and maintenance are reduced.

In addition, in this solution, centralized management may be performed on the border router, so that a fault may be diagnosed quickly and maintenance and operation may be conveniently performed. Furthermore, in this solution, traffic protection may be controlled by using a routing protocol. Because of a fast route advertisement capability and stability of a BGP protocol, this solution may improve efficiency of the traffic attack protection. For example, a conventional blocking procedure of nearly ten seconds may be improved to millisecond, and performance is enhanced by hundreds of times. In addition, because in the BGP protocol, blocking route advertisement is completed in a control protocol plane, not many CPU resources need to be consumed, fundamentally resolving attack brought by the traffic attack protection system to a CPU of a router device and greatly improving stability of an operating device.

In one embodiment, descriptions of another traffic attack protection method are made from a perspective of another traffic attack protection apparatus. The protection apparatus may perform protection processing on the traffic attack, and therefore may also be referred to as a traffic attack protection and processing apparatus. The protection and processing apparatus may be integrated into a border router or another border router device that is at a traffic entrance.

A traffic attack protection method, including: establishing a neighbor relationship with a controller; receiving, based on the neighbor relationship, routing information that is sent by the controller, the routing information including routing address information and a target network address that has been attacked; and performing, based on the routing information, protection processing on the traffic that corresponds to the target network address.

Figure 2:
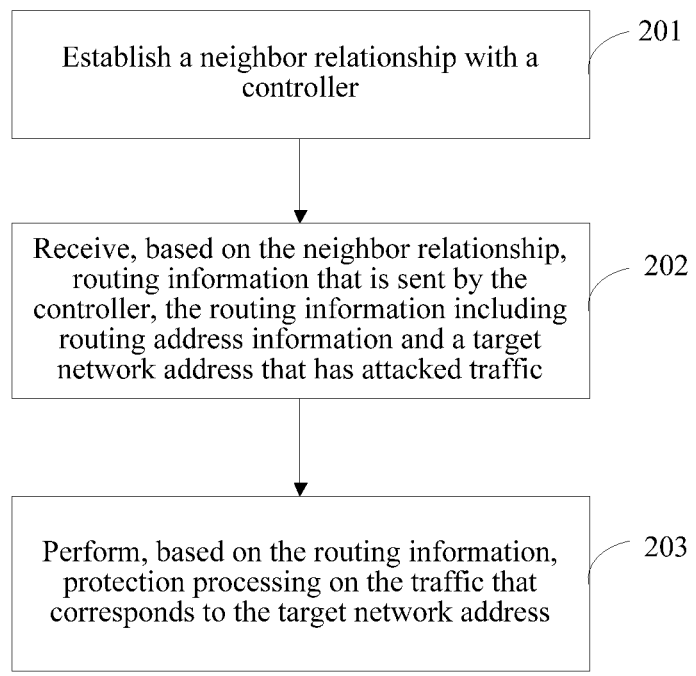
FIG. 2 is another schematic flowchart of a traffic attack protection method according to an embodiment of the present disclosure.

As shown in FIG. 2, a specific procedure of a traffic attack protection method is as follows.

201. Establish a neighbor relationship with a controller.

Specifically, a neighbor relationship may be established with a controller based on a routing protocol. For example, the establishment unit 501 may establish an iBGP neighbor relationship with the controller based on an iBGP protocol.

202. Receive, based on the neighbor relationship, routing information that is sent by the controller, the routing information including routing address information and a target network address that has been attacked.

The target network address may be a network address of which traffic suffers DDoS attack. The target network address may be an IP (Internet Protocol) address, for example, 1.5.3.4/32.

The routing information may be routing information notified by the controller, and the routing address information in the routing information may be routing address information that corresponds to the target network address, for example, may include a next-hop address. The next-hop address may be an address of a device or system that is directly connected to the border router, for example, an interface address of a device or a system that is directly connected to the border router. That is, the next-hop address is an interface address of a next device or system that traffic of the target network address needs to reach by using the border router.

For example, when the next-hop address is an interface address of a device F, the border router sends traffic of a target IP to the device F.

203. Perform, based on the routing information, protection processing on the traffic that corresponds to the target network address.

There may be a plurality of protection processing performed on traffic. For example, the traffic may be filtered or cleaned, or the traffic may be discarded or sealed.

(1) Traffic Cleaning

In one embodiment, the traffic may be filtered by the border router, or the traffic may be filtered by a traffic attack processing system such as a DDoS cleaning system.

That is, the step "performing, based on the routing information, protection processing on the traffic that corresponds to the target network address" may include:

diverting, based on the routing information, the traffic that corresponds to the target network address to the traffic attack processing system, so that the traffic attack processing system filters or cleaning the traffic that corresponds to the target network address; and receiving the filtered or cleaned traffic returned by the traffic attack processing system.

For example, when the routing address information includes the next-hop address, and the next-hop address points to a traffic attack processing system, the step "diverting, based on the routing information, the traffic that corresponds to the target network address to the traffic attack processing system" may include:

extracting traffic that corresponds to the target network address; and diverting the traffic to the traffic attack processing system to which the next-hop address points.

For example, the address of the DDoS cleaning system is 2.2.2.2. When the next-hop address is 2.2.2.2, after receiving the routing information, the border router may divert the traffic that corresponds to the target network address to the DDoS cleaning system, to perform traffic cleaning, and receives the cleaned traffic returned by the DDoS cleaning system.

(2) Traffic Blocking

Specifically, the step "performing, based on the routing information, protection processing on the traffic that corresponds to the target network address" may include: discarding, based on the routing information, the traffic that corresponds to the target network address. That is, the traffic that corresponds to the target network address is sent to the null interface based on the routing information.

When the routing address information may include a next-hop address that corresponds to the target network address, and the next-hop address points to a null interface, the step of "discarding, based on the routing information, the traffic that corresponds to the target network address" may include:

obtaining a corresponding interface based on the next-hop address; and when the interface is a null interface, discarding the traffic that corresponds to the target network address.

For example, it is preconfigured that an address 10.10.10.10 points to Null0. When the next-hop address is 10.10.10.10, the border router obtains a null interface based on the next-hop address. In this case, the border router discards traffic of a target IP.

Optionally, considering that traffic that corresponds to the target network address may exist in the border router, to improve a success rate and applicability of traffic attack protection, already existing local router that corresponds to the target network address needs to be covered. In one embodiment, the already existing local router may be covered by means of a preference. That is, the routing information may further include the preference that corresponds to the routing information. The preference that corresponds to the routing information is higher than a preference of local routing information, and the local routing information is routing information that corresponds to the local target network address. In this case, between steps 202 and 203, the method in some embodiments may further include:

obtaining a preference of local routing information;

determining whether the preference that corresponds to the routing information is higher than the preference of the local routing information; and if yes, performing the step of performing, based on the routing information, protection processing on the traffic that corresponds to the target network address.

It may be learned from the above that, in the embodiment of the present disclosure, the neighbor relationship is established with a controller; routing information that is sent by the controller is received based on the neighbor relationship, the routing information including routing address information and a target network address that has been attacked; and protection processing is performed, based on the routing information, on the traffic that corresponds to the target network address. In the solution, protection processing may be performed on traffic based on routing information sent by a neighbor controller, that is, the protection processing is performed under direct control of the controller. On the one hand, in the solution, a network function module of a traffic cleaning system may be stripped and is replaced with the controller, greatly simplifying the traffic cleaning system and improving stability and maintainability performance of a traffic attack protection system. On the other hand, in the solution, traffic protection may be implemented without depending on black-hole route configuration of a network management system, thereby reducing demands on an intermediate module and attack caused to a CPU of a device in a short time period with frequent attacks, and improving time validity and reliability of the traffic attack protection system.

In addition, in the solution, traffic is prevented from being sealed by configuring black-hole route. Therefore, efficiency and a success rate of traffic attack protection are improved, and costs and a difficulty degree of system operation and maintenance are reduced. Furthermore, in this solution, traffic protection may be controlled by using a routing protocol. Because of a fast route advertisement capability and stability of a BGP protocol, this solution may improve efficiency of the traffic attack protection. For example, a conventional blocking procedure of nearly ten seconds may be improved to millisecond, and performance is enhanced by hundreds of times. In addition, because in the BGP protocol, blocking route advertisement is completed in a control protocol plane, not many CPU resources need to be consumed, fundamentally resolving attack brought by the traffic attack protection system to a CPU of a router device and greatly improving stability of an operating device.

According to the methods described in Embodiments 1 and 2, examples are provided below for further detailed description.

In one embodiment, that a traffic attack protection and control apparatus is integrated into a controller, and a traffic attack protection and processing apparatus is integrated into a border router is used as an example for description.

Figure 3A:
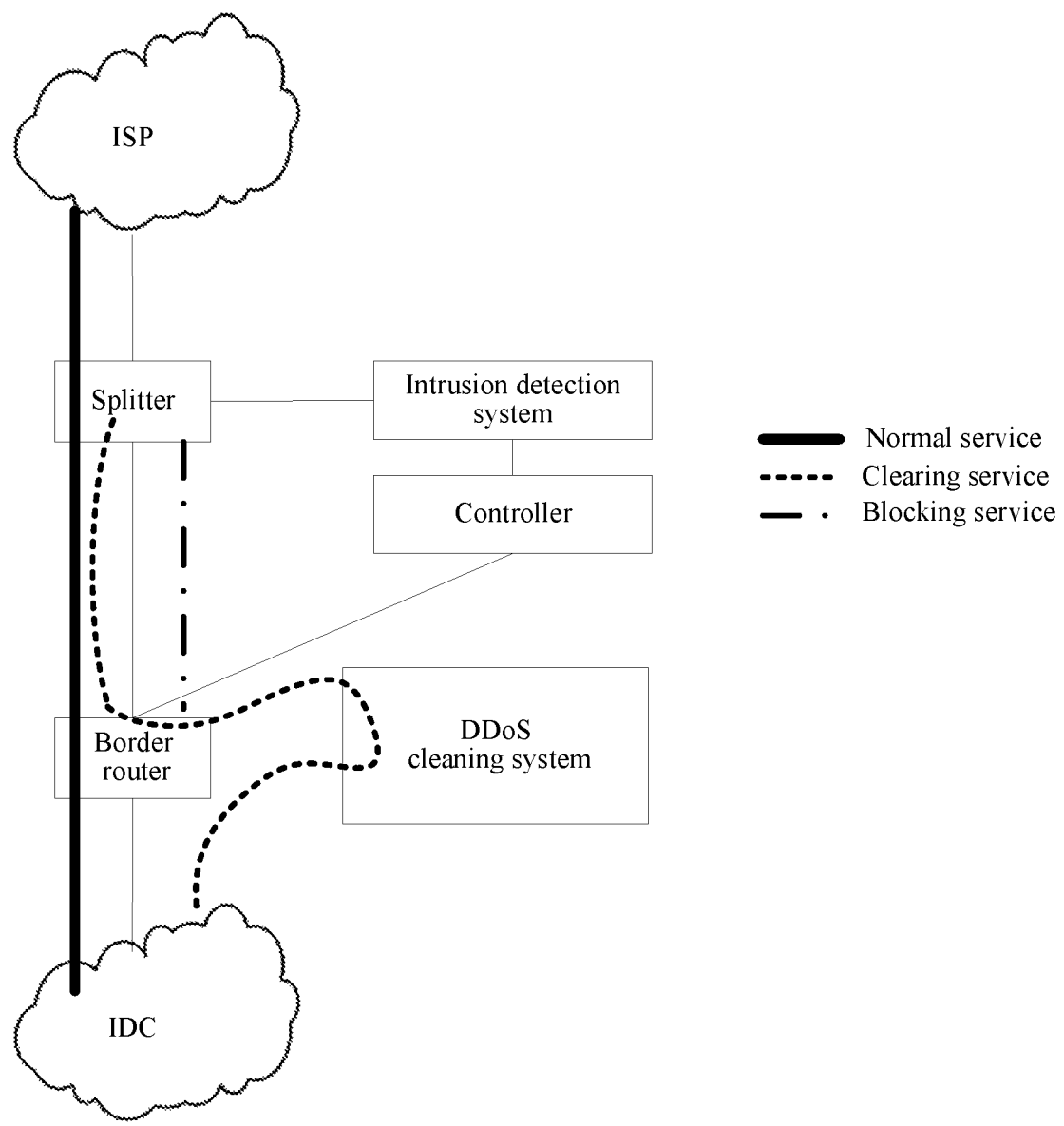
FIG. 3a is a schematic diagram of another scenario of a traffic attack protection system according to an embodiment of the present disclosure.

As shown in FIG. 3*a*, a traffic attack protection system includes: a splitter, an intrusion detection system IDS, a controller, and a DDoS cleaning system and a border router that are at a network traffic entrance. The splitter is connected to an Internet service provider (ISP), and the border router is connected to an Internet data center (IDC). In some embodiments, FIG. 3*a* illustrates logic connection relationship and service flow for one of the border routers shown in FIG. 1*a*. In other words, each set of border router and DDoS cleaning system shown in FIG. 1*a* at each traffic entrance may have same or similar relationship and service logic with the controller as shown in FIG. 3*a*.

Figure 3B:
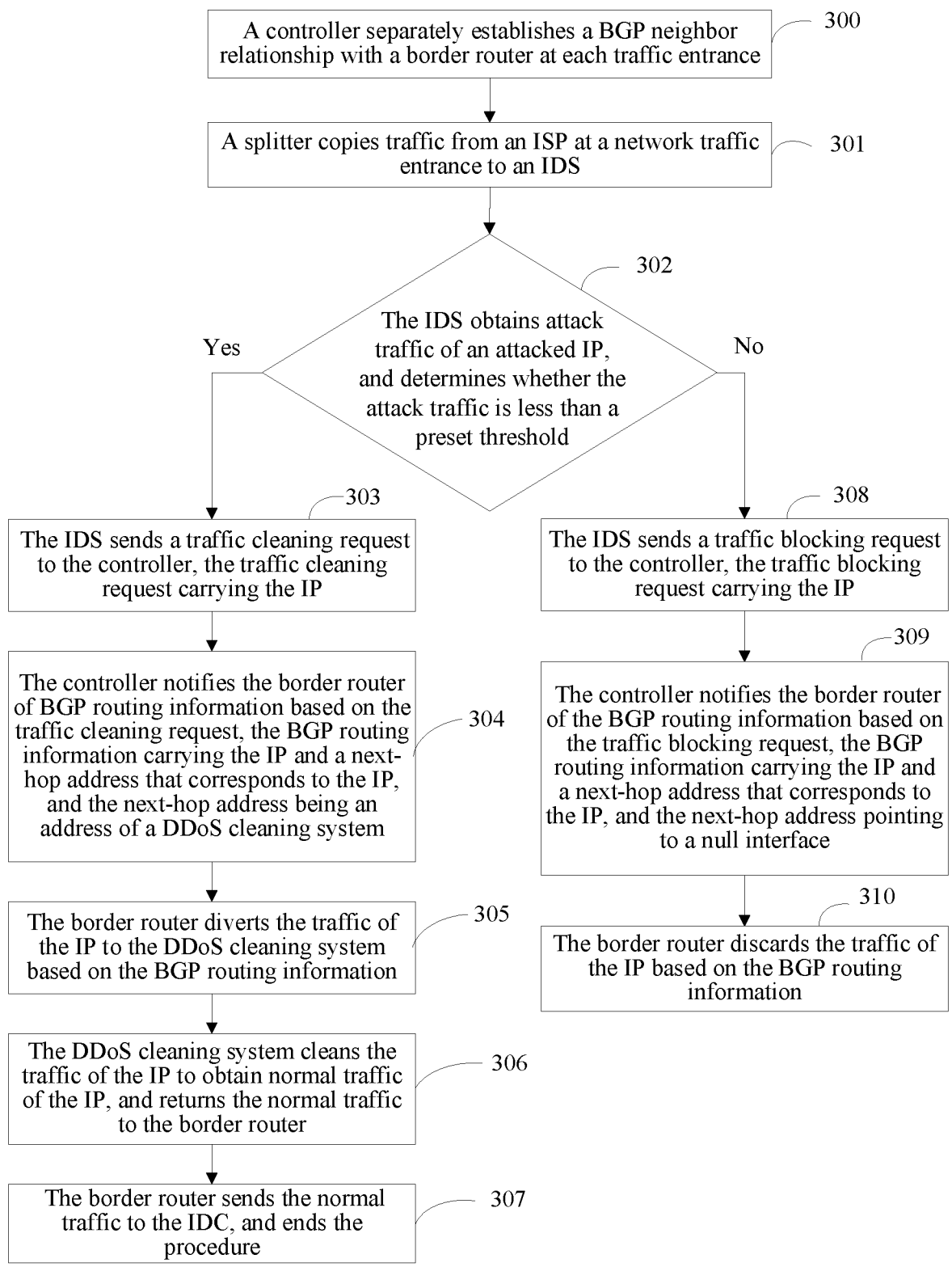
FIG. 3b is still another schematic flowchart of a traffic attack protection method according to an embodiment of the present disclosure.

The following describes, based on the system shown in FIG. 3*a*, a protection method provided in an embodiment of the present disclosure. As shown in FIG. 3*b*, a specific procedure of a traffic attack protection method is as follows.

300. A controller separately establishes a BGP neighbor relationship with a border router at each traffic entrance.

The BGP protocol may be an iBGP protocol or another border routing protocol.

301. A splitter copies traffic from an ISP at a network traffic entrance to an IDS.

302. The IDS obtains attack traffic of an attacked IP, and determines whether the attack traffic is less than a preset threshold, and if yes, step 303 is performed; or if no, step 308 is performed. The controller may determine the next-hop address based on what type of attack protection request (e.g., traffic cleaning request or traffic blocking request) is received.

303. The IDS sends a traffic cleaning request to the controller, the traffic cleaning request carrying the IP.

The controller may provide a northbound Restful interface for the IDS to input the traffic cleaning request. That is, the IDS sends the traffic cleaning request to the controller by using the northbound Restful interface. When the controller receives the traffic cleaning request, the controller may set the next-hop address as pointing to a DDoS cleaning system.

Figure 3C:
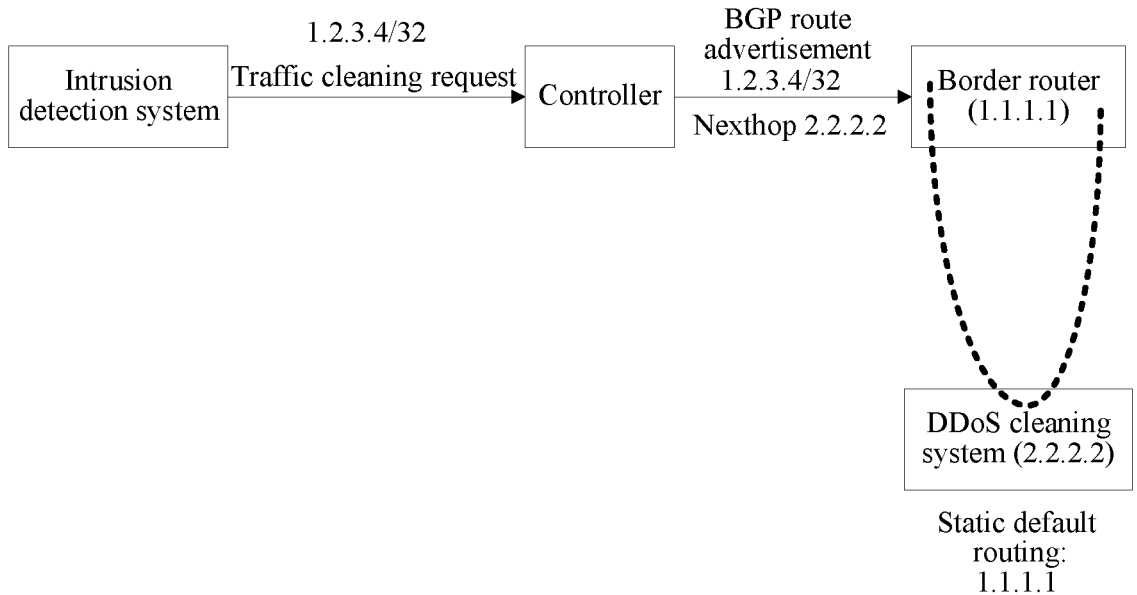
FIG. 3c is a schematic diagram of traffic cleaning according to an embodiment of the present disclosure.

Referring to FIG. 3*c*, it is assumed that an attacked IP is 1.2.3.4/32, an ID of the border router is 1.1.1.1, and an ID of the DDoS cleaning system is 2.2.2.2, the IDS may send a clearing request that carries the IP 1.2.3.4/32 to the controller.

304. The controller notifies the border router of BGP routing information based on the traffic cleaning request, the BGP routing information carrying the IP and a next-hop routing address that corresponds to the IP, and the next-hop routing address being an address of a DDoS cleaning system.

Specifically, the controller may generate the corresponding BGP routing information based on the traffic cleaning request, and then notifies the border router of the BGP routing information based on the neighbor relationship.

Referring to FIG. 3*c*, the controller notifies the border router of the BGP routing information, the BGP routing information including the IP 1.2.3.4/32 and the next-hop routing address 2.2.2.2. In this case, the next-hop routing address is the same as the ID 2.2.2.2 of DDoS cleaning system, that is, the next-hop routing address points to the DDoS cleaning system. The IP may be prefix information of the BGP routing information.

To improve a success rate and applicability of traffic attack protection, the BGP routing information may further include a preference of the BGP routing information. The preference is higher than that of routing information of a local IP of the border router, so that local BGP routing of the border router may be covered.

For example, a local preference (LP) of the iBGP routing is set to be higher than an LP of local iBGP routing of the border router, to cover the existing local BGP routing.

305. The border router diverts the traffic of the IP to the DDoS cleaning system based on the BGP routing information.

Specifically, the border router may extract the traffic of the IP from network traffic, and then diverts the traffic to a DDoS cleaning system to which the next-hop routing address points.

Referring to FIG. 3c, the border router whose address is 1.1.1.1 may divert, based on the BGP routing information, the traffic of the IP 1.2.3.4/32 to the DDoS cleaning system whose address is 2.2.2.2.

When there is a preference of routing information, the border router may obtain local BGP routing information of the IP, then compares the received BGP routing with the local BGP routing information, and if the received BGP routing is higher than the local BGP routing information, diverts traffic of the IP to the DDoS cleaning system based on the BGP routing information.

306. The DDoS cleaning system cleans the traffic of the IP to obtain normal traffic of the IP, and returns the normal traffic to the border router.

Specifically, the DDoS cleaning system may return the normal traffic to the border router based on static default routing information. The static default routing information includes the address of the border router.

Referring to FIG. 3c, after cleaning the traffic of the IP 1.2.3.4/32, the DDoS cleaning system returns, by means of static default routing, cleaned normal traffic of the IP 1.2.3.4/32 to the border router.

307. The border router sends the normal traffic to the IDC, and ends the procedure.

308. The IDS sends a traffic blocking request to the controller, the traffic blocking request carrying the IP. When the controller receives the traffic blocking request, the controller may set the next-hop address as pointing to a null interface.

Referring to FIG. 3c, it is assumed that an attacked IP is 1.2.3.4/32, an ID of the border router is 1.1.1.1, and an ID of the DDoS cleaning system is 2.2.2.2, the IDS may send a traffic blocking request that carries the IP 1.2.3.4/32 to the controller.

309. The controller notifies the border router of the BGP routing information based on the traffic blocking request, the BGP routing information carrying the IP and a next-hop routing address that corresponds to the IP, and the next-hop routing address pointing to a null interface.

Specifically, the controller may generate the corresponding BGP routing information based on the traffic cleaning request, and then notifies the border router of the BGP routing information based on the neighbor relationship.

Figure 3D:
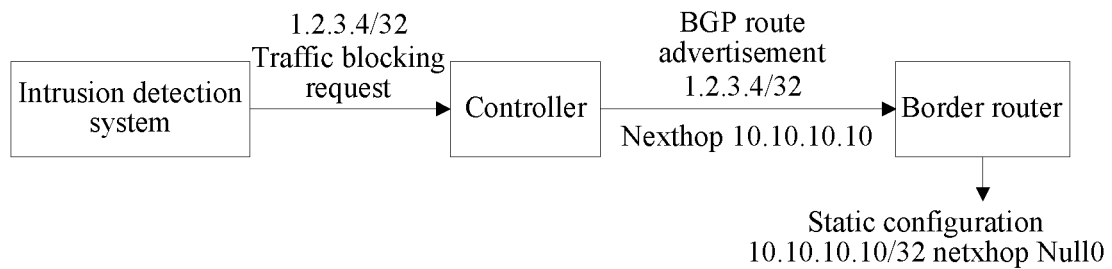
FIG. 3d is a schematic diagram of traffic blocking according to an embodiment of the present disclosure.

Referring to FIG. 3d, the controller notifies the border router of the BGP routing information, the BGP routing information including an IP 1.2.3.4/32 and a next-hop routing address 10.10.10.10, and the next-hop routing address 10.10.10.10 pointing to Null0. The IP may be prefix information of the BGP routing information.

During actual application, a special piece of static blackhole route may be configured in a persistent and static manner on the border router in advance, and an outbound interface of a designated IP (i.e. 10.10.10.10) points to Null0.

To improve a success rate and applicability of traffic attack protection, the BGP routing information may further include a preference of the BGP routing information. The preference is higher than that of routing information of a local IP of the border router, so that local BGP routing of the border router may be covered.

For example, an LP of the iBGP routing is set to be higher than an LP of local iBGP routing of the border router, to cover the existing local BGP routing.

310. The border router discards the traffic of the IP based on the BGP routing information.

The border router may calculate a corresponding interface based on the next-hop routing address of the IP, and discards the traffic of the IP when the interface is a null interface. In one embodiment, because the next-hop routing address of the IP points to the null interface, the border router may discard the traffic of the IP.

Figure 3E:
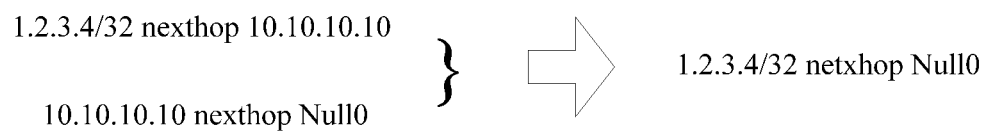
FIG. 3e is a schematic diagram of an address relationship according to an embodiment of the present disclosure.

Referring to FIG. 3d and FIG. 3e, by means of BGP route iteration, a next-hop address of the BGP routing points to Null0, so that the border router discards traffic of the IP 1.2.3.4/32.

When there is a preference of routing information, the border router may obtain local BGP routing information of the IP, then compares the received BGP routing with the local BGP routing information, and if the received BGP routing is higher than the local BGP routing information, discards the traffic of the IP based on the BGP routing information.

Figure 4:
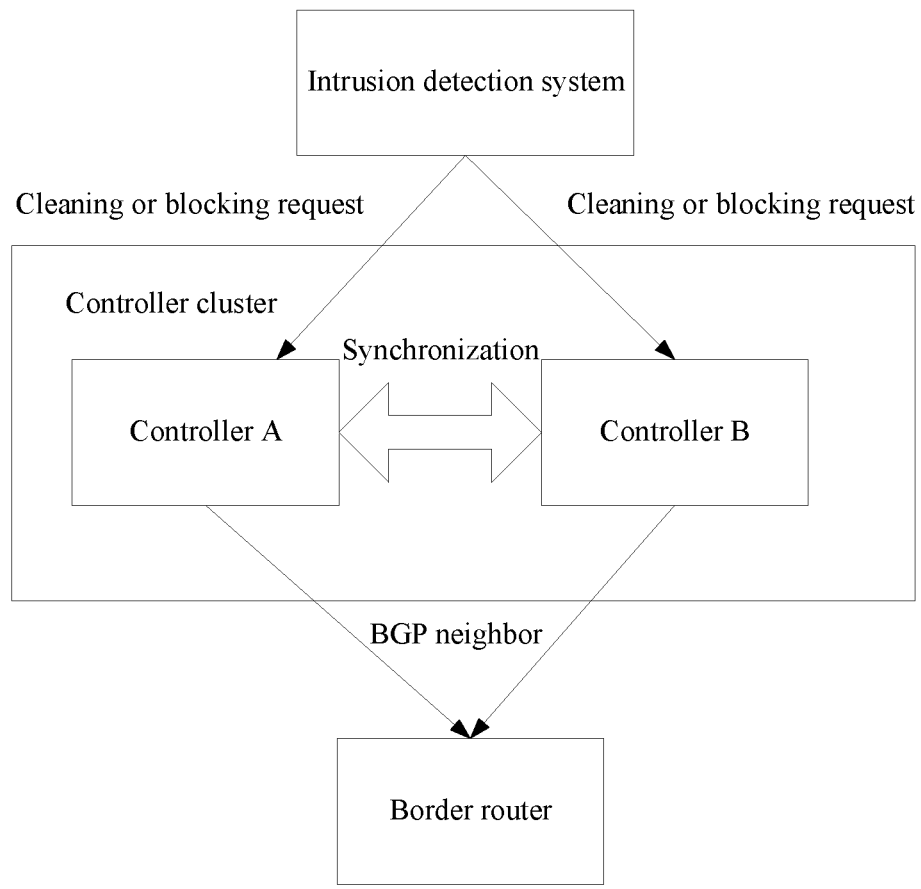
FIG. 4 is a schematic structural diagram of a controller cluster according to an embodiment of the present disclosure.

Optionally, to ensure high availability and in-service software upgrade (ISSU) of a system, a controller cluster of a dual-active cluster architecture is used in the embodiment of the present disclosure. Dual active controller connects to an IDS system northwardly and connects to a border router southwardly at the same time. When one controller is faulty, the other controller can still ensure continuity of the service. The dual active controllers are periodically synchronized, to perform reliability verification. When being recovered from the fault, or after software upgrade, the one controller automatically obtains, from the other controller, all delivery records of the BGP routing by using a synchronization mechanism between the clusters, and then locally generates and re-delivers the records, to recover the high availability of the cluster of the system. Referring to FIG. 4, when a controller A is faulty or during software upgrade, a controller B may be used to implement traffic protection. It can be learned that, there may be a plurality of controllers in a protection system, and each controller can perform the traffic attack protection method.

When the IDS delivers an attack protection request (e.g., a cleaning/redirecting request or a blocking request) to the controllers in the cluster, a current time stamp is used as a parameter to be placed in the request. In other words, each attack protection request includes a time stamp. The time stamp is used as a reference during subsequent consistency verification performed on data between the clusters.

When a single controller is faulty (for example, the controller A), the IDS cluster may still provide DDoS cleaning diversion routing and blocking routing by using the controller B. When the controller is recovered from the fault, the controller obtains, from the other controller by using a Restful data synchronization channel between the controllers in the cluster, all BGP routing delivery records, and generates and re-delivers the records to a device, so that the entire cluster system recovers the high availability. In other words, when controller A is offline due to faulty reasons or upgrade requirements, controller B can maintain services of: receiving the attack protection request, generating the routing information, and sending the routing information to the corresponding boarder router. When both controllers are online, routing delivery records can be synchronized between the two controllers.

During system software upgrade, one controller is upgraded first, and data synchronization is performed after the upgrade. After the cluster system recovers high availability, the other controller is upgraded. During the upgrade, because there is always a controller in a working state, and the system can finally recover a high availability state, the service is not affected, and the entire system may implement ISSU.

In a stable state, the controllers in the cluster perform data verification periodically, and the time stamp is used as a reference, to update all data of the controllers in the cluster to the newest by means of synchronization to ensure consistency. A specific verification process is as follows:

a. the controllers in the cluster send time stamps that are recorded most recently to each other;

b. the controllers compare the time stamps that are sent by each other with the newest local time stamp;

b1. if the time stamp of another controller is earlier than or equal to the newest local time stamp, it indicates that the local record is the newest and no operation needs to be performed; and b2. if the time stamp of another controller is later than the newest local time stamp, a Restful interface provided by a peer end controller is invoked, all route delivery records from the newest local time stamp to the time stamp provided by the another controller are obtained, and the records are delivered to a device after being generated locally, to implement data consistency between clusters.

In one embodiment, the IDS may use a cluster, that is, the IDS in one embodiment is a member system in an IDS cluster. For example, the IDS cluster may be an IDS cluster including at least two IDSs. In some embodiments, each traffic entrance may have a corresponding IDS.

In conventional DDoS attack protection system, unlike the disclosed controller which can establish neighbor relationships with multiple border routers at multiple traffic entrances, an individual network management system needs to be configured at each border router and traffic entrance, and needs to be dedicated to the corresponding border router to handle DDoS blocking or redirection requests. Specifically, the DDoS cleaning system and the border router needs to be established as eBGP neighbors and instruct a diversion router. This requires integration of security function module and network function module at the DDoS cleaning system to support BGP routing protocol stack, thereby greatly increasing complexity of the DDoS cleaning system and reducing stability and maintainability of the entire system. In addition, since the existing deployment adopts a distributed mode, the border router and the DDoS cleaning system at each traffic entry need to independently maintain a set of local BGP redirection routing information. Distributed routing management increases the difficulty of troubleshooting and network module operation and maintenance in network failure scenarios. Secondly, in the case of DDoS blocking, the prior art solution must introduce a network management system for black hole routing configuration. The additional intermediate module not only reduces the timeliness of the blocking, but also adds additional risks of failure, reducing the reliability of prior art solutions.

There are several major problems in the process of sending black hole routes using the traditional SSH/TELNET login device configuration: 1. Due to the response of the network device and the delay between calls between systems, the entire blocking process takes a long time, from trigger blocking to completion of blocking, and the cycle is nearly ten seconds. This not only seriously affects the user experience, but also has a great impact on the data center due to the short-term spread of attack traffic. 2. In the scenario of frequent DDoS attacks in a short period of time, one needs to configure a large number of blackhole routes on the system for blocking. Due to the limitation of the processing capability of the system, this scenario will greatly impact the CPU of some devices and affect the normal operation of the system. 3. Due to device instability, the prior art scheme has the possibility of failure when configuring or removing black hole routers. The scenario described in the second point will further aggravate the problem and further reduce the success rate of blocking/unblocking. This not only seriously affects the perception of the service, but also increases the network threat caused by the DDoS attack. It also requires the intervention of manual operation and maintenance, which leads to elevated cost and difficulty of operation and maintenance. 4. The prior art solution cannot support concurrent blocking operations. In the scenario of multiple simultaneous attacks, the concurrent blocking request can only be forwarded to serial configuration blocking by means of a queue, which greatly reduces the efficiency and timeliness of the blocking.

It can be learned from the above that, compared with a conventional attack protection system, the protection system provided in the embodiment of the present disclosure at least has the following advantages:

(1) A centralized and integrated DDoS diversion and blocking network system is used, and Attack traffic diversion and blocking are integrated. One the one hand, the network function module in the DDoS cleaning system is successfully stripped, to simplify system cleaning. On the other hand, the entire system is no longer relied on a network management system, reducing demands on an intermediate module. Stability and time validity of the entire system are improved from multiple dimensions.

(2) A fault diagnosis capability of the system is improved and complexity of operation and maintenance are reduced by means of centralized diversion and blocking route management. A centralized and integrated system facilitates system deployment and online of a new DDoS protection node.

(3) DDoS blocking is performed by means of centralized BGP route advertisement without a need of device configuration in a conventional method, a concurrency capability is supported, and time validity and reliability of blocking are greatly improved and attack on a network device is reduced.

(4) Based on an SDN controller and DDoS blocking performed by means of BGP route advertisement, a software multithread architecture makes the system be capable of supporting concurrent cleaning/blocking (note: it is indicated through a test that the system provided in the embodiment of the present disclosure may support concurrent cleaning and/or blocking of more than 1000 IPs at the maximum). On blocking time validity, because of a fast route advertisement capability and stability of a BGP protocol, a conventional blocking procedure of nearly ten seconds may be improved to millisecond, performance is enhanced by hundreds of times, and a successful rate of blocking/de-blocking is enhanced to 100%.

(5) Because the BGP protocol completes blocking route advertisement in a control protocol plane, not many CPU resources need to be consumed. By using the system provided in the embodiment of the present disclosure, attack brought by the blocking system to a CPU of a device is fundamentally resolved, and stability of an operating device is greatly improved.

(6) A dual-active cluster architecture and periodic verification and online synchronization mechanism between clusters ensure high availability and ISSU of the system.

Figure 5:
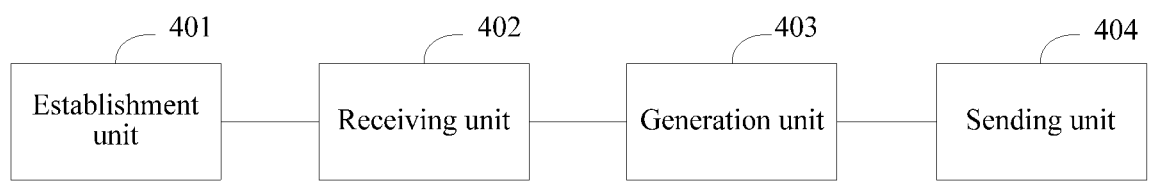
FIG. 5 is a schematic structural diagram a traffic attack protection and control apparatus according to an embodiment of the present disclosure.

To better implement the foregoing methods, one embodiment of the present disclosure further provides a traffic attack protection apparatus. The protection apparatus may perform traffic attack protection and control, and therefore may also be referred to as a traffic attack protection and control apparatus. As shown in FIG. 5, the traffic attack protection and control apparatus may include the following structure (because the protection and control apparatus may be integrated into a controller, the controller may also include the following structure):

one or more memories; and
one or more processors,
the one or more memories storing one or more instruction modules, configured to be executed by the one or more processors, and
the one or more instruction modules including: an establishment unit 401, a receiving unit 402, a generation unit 403, and a sending unit 404 that are as follows.

(1) The Establishment Unit 401

The establishment unit 401 is configured to establish a neighbor relationship with a border router at a traffic entrance. That is, the establishment unit 401 is configured to establish a neighbor relationship with border routers at one or more traffic entrances.

For example, the establishment unit 401 is configured to establish a neighbor relationship with a border router based on a BGP protocol.

The establishment unit 401 may be specifically configured to: send a neighbor relationship establishment request to a border router at a traffic entrance; receive response information that is returned by the border router based on the neighbor relationship establishment request; and establish a neighbor relationship based on the response information.

(2) The Receiving Unit 402

The receiving unit 402 is configured to receive an attack protection request that is sent by an intrusion detection system at the traffic entrance, the attack protection request carrying a target network address that has been attacked. That is, the receiving unit 402 is configured to receive an attack protection request that is sent by an intrusion detection system at any one of the one or more traffic entrances, the attack protection request carrying a target network address that has been attacked.

The target network address may be a network address of which traffic suffers DDoS attack. The target network address may be an Internet Protocol (IP) address.

For example, the receiving unit 402 may be configured to receive, by using a northbound interface, an attack protection request that is sent by an intrusion detection system at the traffic entrance.

There may be a plurality of types of traffic attack protection requests. For example, the attack protection request may include: a traffic filtering (or cleaning) request, or a traffic blocking (or discarding) request.

(3) The Generation Unit 403

The generation unit 403 is configured to generate corresponding routing information based on the attack protection request, the routing information including the target network address and routing address information. That is, the generation unit 403 is configured to generate corresponding routing information based on the attack protection request, the routing information including the target network address and routing address information.

For example, the generation unit 403 may be configured to generate corresponding iBGP routing information based on the attack protection request. The target network address is a prefix of the routing information, and the target network address may represent/indicate routing (e.g., routing path or router) to which the routing information correspond.

Specifically, the generation unit 403 may include:
a parsing subunit, configured to parse the attack protection request to obtain the target network address;
a setting subunit, configured to set a next-hop address that corresponds to the target network address; and
a generation subunit, configured to generate corresponding routing information based on the target network address and the next-hop address, the routing information including the target network address and the next-hop address.

The routing address information may be routing address information that corresponds to the target network address, for example, may include a next-hop address. The next-hop address may be an address of a device or a system that is directly connected to the border router.

For different types of traffic attack protection requests, set next-hop addresses are different. When the attack protection request is a traffic filtering request, the next-hop address may be set to point to a traffic attack processing system (for example, a DDoS cleaning system); or when the attack protection request is a traffic blocking request, the next-hop address may be set to point to a null interface.

(4) The Sending Unit 404

The sending unit 404 is configured to send the routing information to the border router based on the neighbor relationship, so that the border router performs, based on the routing information, protection processing on the traffic that corresponds to the target network address. That is, the sending unit 404 is configured to send the routing information to a corresponding border router based on the neighbor relationship, so that the corresponding border router performs, based on the routing address information, protection processing on traffic that corresponds to the target network address, the corresponding border router being a border router at the traffic entrance at which the intrusion detection system that sends the attack protection request is located.

For example, the attack protection request includes a traffic filtering request, and the next-hop address points to a traffic attack processing system. The sending unit 404 is configured to notify the border router of the routing information based on the neighbor relationship, so that the border router diverts, based on the routing information, the traffic that corresponds to the target network address to the traffic processing system, to perform traffic filtering processing.

For another example, the attack protection request includes a traffic blocking request, and the next-hop address points to a null interface. The sending unit 404 is configured to notify the border router of the routing information based on the neighbor relationship, so that the border router discards, based on the routing information, the traffic that corresponds to the target network address.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

It can be learned from above that in embodiments of the present disclosure, the establishment unit 401 establishes a neighbor relationship with the border router at the traffic entrance; the receiving unit 402 receives the attack protection request sent by the intrusion detection system at the traffic entrance, the attack protection request carrying a target network address that has been attacked; the generation unit 403 generates corresponding routing information based on the attack protection request, the routing information including the target network address and the routing address information; and the sending unit 404 sends the routing information to the border router based on the neighbor relationship, so that the border router performs, based on the routing information, the protection processing on the traffic that corresponds to the target network address. In this solution, because the neighbor relationship can be directly established with the border router, and the routing information can be sent to the border router, the traffic attack protection and control is implemented. On the one hand, in the solution, a network function module can be stripped from the traffic cleaning system, to simplify the traffic cleaning system and improve stability and maintenance of the traffic attack protection system. On the other hand, in the solution, traffic protection can be implemented by controlling the border router without depending on a network management system, thereby reducing demands on an intermediate module and attack caused to a CPU of a device in a short time period with frequent attacks, and improving time validity and reliability of the traffic attack protection system.

Figure 6A:
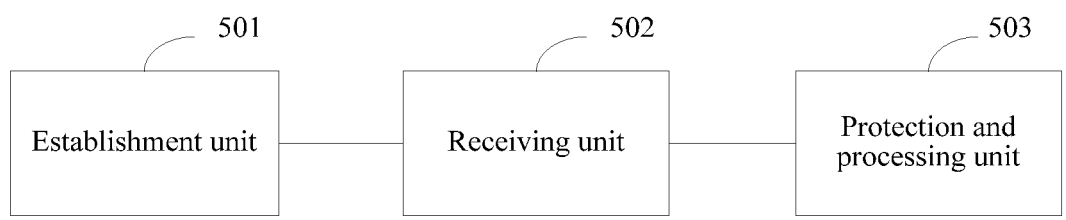
FIG. 6a is a schematic structural diagram of a traffic attack protection and processing apparatus according to an embodiment of the present disclosure.

To better implement the foregoing methods, an embodiment of the present disclosure further provides a traffic attack protection apparatus. The protection apparatus may perform protection processing on traffic attack, and therefore may also be referred to as a traffic attack protection and processing apparatus. As shown in FIG. 6a, the traffic attack protection and processing apparatus may include the following structure (because the protection and processing apparatus may be integrated into a border router, the border router may also include the following structure):

one or more memories; and one or more processors, the one or more memories storing one or more instruction modules, configured to be executed by the one or more processors, and the one or more instruction modules including: an establishment unit 501, a receiving unit 502, and a protection and processing unit 503 that are as follows.

(1) The Establishment Unit 501

The establishment unit 501 is configured to establish a neighbor relationship with a controller.

For example, the establishment unit 501 may be configured to establish a neighbor relationship with a controller based on a routing protocol. For example, the establishment unit 501 may establish an iBGP neighbor relationship with the controller based on an iBGP protocol.

(2) The Receiving Unit 502

The receiving unit 502 is configured to receive, based on the neighbor relationship, routing information that is sent by the controller, the routing information including routing address information and a target network address that has been attacked.

The target network address may be a network address of which traffic suffers DDoS attack. The target network address may be an IP (Internet Protocol) address, for example, 1.5.3.4/32.

The routing information may be routing information notified by the controller, and the routing address information in the routing information may be routing address information that corresponds to the target network address, for example, may include a next-hop address. The next-hop address may be an address of a device or system that is directly connected to the border router, for example, an interface address of a device or a system that is directly connected to the border router. That is, the next-hop address is an interface address of a next device or system that traffic of the target network address needs to reach by using the border router.

(3) The Protection and Processing Unit 503

The protection and processing unit 503 is configured to perform, based on the routing information, protection processing on the traffic that corresponds to the target network address.

For example, the routing address information includes a next-hop address that corresponds to the target network address, and the next-hop address points to a traffic attack processing system. The protection and processing unit 503 may include:

a diversion subunit, configured to divert, based on the routing information, the traffic that corresponds to the target network address to the traffic attack processing system, so that the traffic attack processing system filters the traffic that corresponds to the target network address; and a receiving subunit, configured to receive traffic that is obtained after the filtering and that is returned by the traffic attack processing system.

For another example, the routing address information includes a next-hop address that corresponds to the target network address, and the next-hop address points to a null interface. The protection and processing unit 503 is specifically configured to discard, based on the routing information, the traffic that corresponds to the target network address. That is, the protection and processing unit is specifically configured to send, based on the routing information, the traffic that corresponds to the target network address to the null interface.

Specifically, the routing address information includes the next-hop address that corresponds to the target network address, and the next-hop address points to a null interface. In this case, the protection and processing unit 503 may include:

an obtaining subunit, configured to obtain a corresponding interface based on the next-hop address; and a discarding subunit, configured to: when the interface is a null interface, discard traffic that corresponds to the target network address.

Figure 6B:
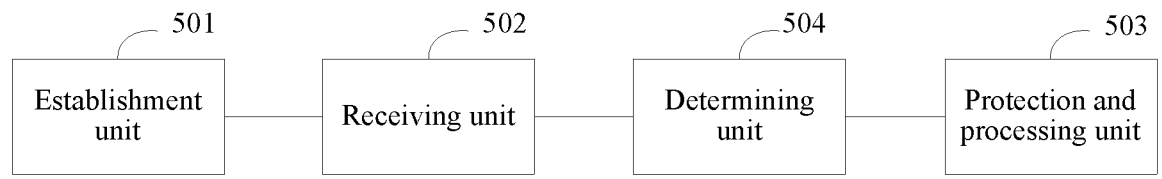
FIG. 6b is another schematic structural diagram of a traffic attack protection and processing apparatus according to an embodiment of the present disclosure.

Optionally, the routing information further includes a preference that corresponds to the routing information, the preference that corresponds to the routing information is higher than a preference of local routing information, and the local routing information is routing information that corresponds to the local target network address. Referring to FIG. 6b, the protection and processing apparatus of the embodiment of the present disclosure further includes a determining unit 504.

The determining unit 504 is configured to: after the receiving unit 502 receives the routing information and before the protection and processing unit 503 performs the protection processing, obtain the preference of the local routing information; and determine whether the preference that corresponds to the routing information is higher than the preference of the local routing information.

The protection and processing unit 503 is configured to: when the determining unit 504 determines that the preference that corresponds to the routing information is higher than the preference of the local routing information, perform, based on the routing information, protection processing on the traffic that corresponds to the target network address.

The determining unit 504 may also be referred to as an obtaining unit. The obtaining unit is configured to: after the receiving unit receives the routing information and before the protection and processing unit performs the protection processing, obtain a preference that is of local routing information and that corresponds to the target network address. The protection and processing unit is configured to: if the preference that corresponds to the routing information is higher than the preference of the local routing information, perform, based on the routing information, the step of performing protection processing on the traffic that corresponds to the target network address.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

It may be learned from the above that, in the embodiment of the present disclosure, the establishment unit 501 establishes the neighbor relationship with the controller; the receiving unit 502 receives, based on the neighbor relationship, the routing information sent by the controller, the routing information including the routing address information and the target network address having attacked traffic; and the protection and processing unit 503 performs, based on the routing information, protection processing on the traffic that corresponds to the target network address. In the solution, protection processing may be performed on traffic based on routing information sent by a neighbor controller, that is, the protection processing is performed under direct control of the controller. On the one hand, in the solution, a network function module of a traffic cleaning system may be stripped and is replaced with the controller, greatly simplifying the traffic cleaning system and improving stability and maintainability performance of a traffic attack protection system. On the other hand, in the solution, traffic protection may be implemented without depending on black-hole route configuration of a network management system, thereby reducing demands on an intermediate module, and improving time validity and reliability of the traffic attack protection system.

In addition, in the solution, traffic is prevented from being sealed by configuring black-hole route. Therefore, efficiency and a success rate of traffic attack protection are improved, and costs and a difficulty degree of system operation and maintenance are reduced. Furthermore, in this solution, traffic protection may be controlled by using a routing protocol. Because of a fast route advertisement capability and stability of a BGP protocol, this solution may improve efficiency of the traffic attack protection. For example, a conventional blocking procedure of nearly ten seconds may be improved to millisecond, and performance is enhanced by hundreds of times. In addition, because in the BGP protocol, blocking route advertisement is completed in a control protocol plane, not many CPU resources need to be consumed, fundamentally resolving attack brought by the traffic attack protection system to a CPU of a router device and greatly improving stability of an operating device.

In addition, the embodiment of the present disclosure further provides a traffic attack protection system. The traffic attack protection system includes any protection and control apparatus (or the controller) and any protection and processing apparatus (or the border router) that are provided in the embodiments of the present disclosure. For details, refer to Embodiments 4 and 5. For example, the protection and control apparatus and the protection and processing apparatus may be as follows:

The protection and control apparatus (or the controller) is configured to: establish a neighbor relationship with a border router at a traffic entrance; receive an attack protection request that is sent by an intrusion detection system at the traffic entrance, the attack protection request carrying a target network address that has been attacked; generate corresponding routing information based on the attack protection request, the routing information including the target network address and routing address information; and send the routing information to the border router based on the neighbor relationship, so that the border router performs, based on the routing information, protection processing on the traffic that corresponds to the target network address.

The protection and processing apparatus (or the border router) is configured to: establish a neighbor relationship with a controller; receive, based on the neighbor relationship, routing information that is sent by the controller, the routing information including routing address information and a target network address that has been attacked; and perform, based on the routing information, protection processing on the traffic that corresponds to the target network address. In the solution, protection processing may be performed on traffic based on routing information sent by a neighbor controller.

The protection and control apparatus may be integrated into the controller in a form of a client or another software form, and the protection and processing apparatus may be integrated into the border router.

For a specific implementation of each of the foregoing devices, refer to the foregoing embodiments, and details are not described herein again.

In addition, the traffic attack protection system may further include another device or system, for example, may further include a traffic processing system (a DDoS cleaning system), a splitter, an IDS, and the like.

Because the traffic attack protection system may include any protection and control apparatus and protection and processing apparatus that are provided in the embodiments of the present disclosure, beneficial effects that can be implemented by any protection and control apparatus and protection and processing apparatus that are provided in the embodiments of the present disclosure can be implemented. For details, refer to the foregoing embodiments, and details are not described herein again.

Persons of ordinary skill in the art may understand that all or some of the steps of the methods in the foregoing embodiments may be implemented by a program instructing relevant hardware. The program may be stored in a computer readable storage medium. The storage medium may include: a read-only memory (ROM), a random access memory (RAM), a magnetic disk, an optical disc, or the like.

An embodiment of the present disclosure further provides a non-volatile computer-readable storage medium, the non-volatile computer-readable storage medium storing a computer-readable instruction, so that at least one processor can perform the foregoing methods.

Figure 7:
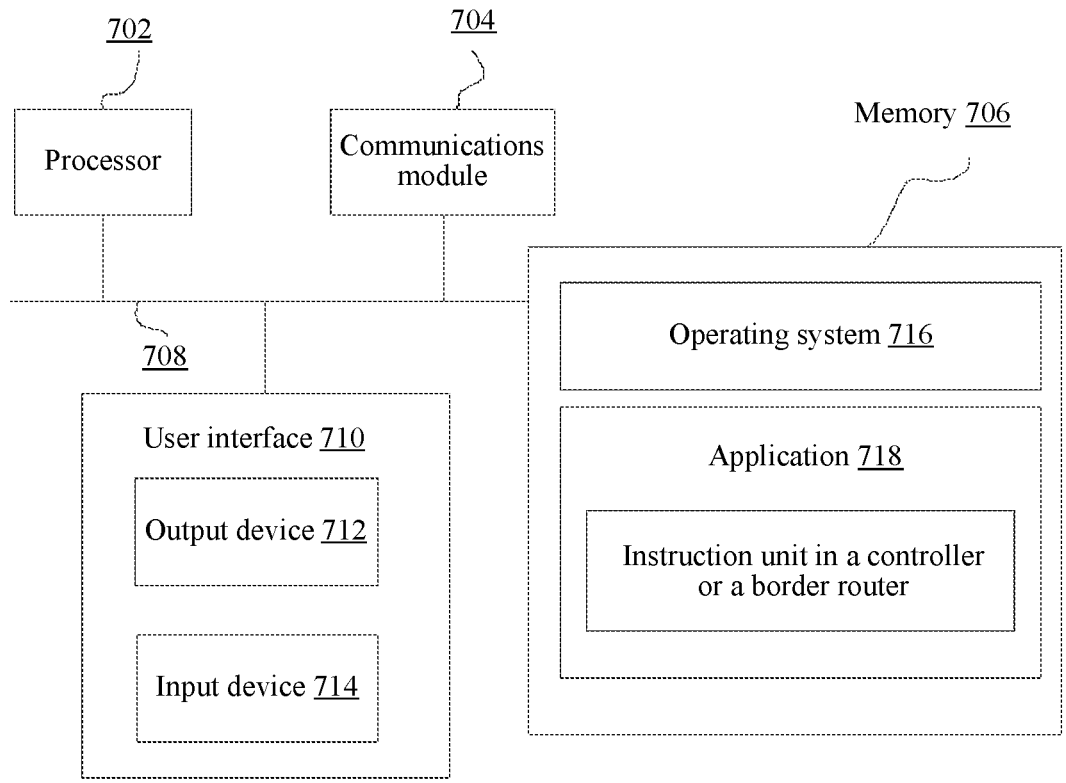
FIG. 7 is a schematic structural diagram of a computer device according to an embodiment of the present disclosure.

An embodiment of the present disclosure further provides a computer device. The device may be a controller, or may be a border router. As shown in FIG. 7, the computer device includes: one or more processors (CPU) 702, a communications module 704, a memory 706, a user interface 710, and a communications bus 708 used for connecting the components to each other.

The processor 702 may receive and send data by using the communications module 704, to implement network communication and/or local communication.

The user interface 710 includes one or more output devices 712, and the user interface 710 includes one or more speakers and/or one or more visual displays. The user interface 710 may also include one or more input devices 714, and the user interface 710 includes, for example, a keyboard, a mouse, a voice command input unit or a speaker, a touchscreen display, a touch-sensitive panel, a gesture capture camera or another input button or control.

The memory 706 may be a fast random access memory such as a DRAM, an SRAM, a DDR RAM, or another random access solid storage device; or a non-volatile memory such as one or more disk storage devices, an optical disc storage device, a flash storage device, or another non-volatile solid storage device.

The memory 706 stores an executable instruction set of the processor 702, including:

an operating system 716, including a program configured to process various basic system services and configured to execute hardware-related tasks; and an application 718, including various application programs used for traffic protection. The application program can implement the processing procedures of the foregoing embodiments, for example, may include some or all of the instruction modules or units in the controller or the border router. The processor 702 executes a machine-executable instruction of at least one of the units in the memory 706, to implement a function of at least one module in the foregoing units or modules.

It should be noted that, all steps and modules in the foregoing procedures and structural diagrams are not necessary, some steps or modules may be omitted according to actual needs. An execution sequence of the steps is not fixed, and may be adjusted according to needs. Division of the modules is merely functional division for ease of description. During actual implementation, one module may be implemented separately by multiple modules, and functions of multiple modules may also be implemented by one same module. The modules may be located in a same device, and may also be located in different devices.

The hardware modules in the embodiments may be implemented in a hardware manner or by using a hardware platform plus software. The foregoing software includes a machine-executable instruction, stored in a non-volatile storage medium. Therefore, each instance may be implemented in a form of a software product.

In each instance, hardware may be implemented by using dedicated hardware or hardware executing the machine-executable instruction. For example, hardware may be a specifically designed permanent circuit or logical device (for example, a dedicated processor, such as an FPGA or an ASIC) for completing a specific operation. The hardware may also include a programmable logical device or circuit (for example, including a general processor or another programmable processor) configured temporarily by software and configured to execute a specific operation.

In addition, each instance of this application may be implemented by a data processing program executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of a data processing device for execution. Therefore, such a storage medium constitutes this application. This application further provides a non-volatile the storage medium storing a data processing program. The data processing program may be configured to perform any instance in the foregoing method embodiments in this application.

The machine-executable instruction corresponding to the module in FIG. 7 may enable an operating system operated on the computer or the like to complete some or all of the operations described herein. The non-volatile computer-readable storage medium may be inserted into a memory that is set in an extension board in a computer or is written to a memory that is set in an extension unit that is connected to a computer. A CPU installed on an extension board or an extension unit may perform some or all of actual operations based on the instruction.

The traffic attack protection method, the control apparatus, and the processing apparatus and the system that are provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, persons skilled in the art may make modifications to the specific implementations and application range according to the idea of the present disclosure. In conclusion, the content of this specification should not be construed as a limitation to the present disclosure.

What is claimed is:

1. A method for protection against cyberattack, comprising:
    establishing, by a controller, neighbor relationships with border routers at a plurality of traffic entrances;
    receiving, by the controller, an attack protection request sent by an intrusion detection system (IDS) at a first traffic entrance, the first traffic entrance being any one of the plurality of traffic entrances, and the attack protection request carrying a target network address that has been attacked, wherein the attack protection request includes a traffic cleaning request or a traffic blocking request, and wherein the receiving includes:
        in response to determining by the IDS that traffic corresponding to the target network address is less than a preset threshold, obtaining from the IDS, by the controller, the traffic cleaning request; and
        in response to determining by the IDS that the traffic corresponding to the target network address is not less than a preset threshold, obtaining from the IDS, by the controller, the traffic blocking request;
    generating, by the controller, routing information based on the attack protection request, the routing information including the target network address and routing address information; and
    sending, by the controller, the routing information to a first border router based on the neighbor relationships, so that the first border router performs, based on the routing address information, protection processing on the traffic that corresponds to the target network address, the first border router being a border router at the first traffic entrance at which the intrusion detection system that sends the attack protection request is located.

2. The method according to claim 1, wherein generating the routing information based on the attack protection request comprises:
    parsing the attack protection request to obtain the target network address;
    setting a next-hop address that corresponds to the target network address; and
    generating the routing information based on the target network address and the next-hop address, the routing information including the target network address and the next-hop address.

3. The method according to claim 2, further comprising:
setting the next-hop address as pointing to a first traffic attack processing system;
diverting, by the first border router based on the routing information, the traffic that corresponds to the target network address to the first traffic attack processing system, so that the first traffic attack processing system filters the traffic that corresponds to the target network address; and
receiving, by the first border router, traffic that is filtered and returned by the first traffic attack processing system.

4. The method according to claim 2, further comprising:
setting the next-hop address as pointing to a null interface; and
sending, by the first border router based on the routing information, the traffic that corresponds to the target network address to the null interface.

5. The method according to claim 1, wherein the routing information further includes a preference that corresponds to the routing information; and after the controller receives the routing information and before the first border performs the protection processing, the method further comprises:
setting the preference that corresponds to the routing information as being higher than a local preference of the first border router; and
performing, by the first border router and based on the routing information, the protection processing on the traffic that corresponds to the target network address.

6. The method according to claim 1, wherein: the controller is a controller group including at least a first controller and a second controller; each attack protection request sent from the intrusion detection system and received by the controller group further includes a time stamp; and the method further comprises:
upon determining one of the first controller and the second controller is offline, maintaining, by the other one of the first controller and the second controller, services of: receiving the attack protection request, generating the routing information, and sending the routing information to the first border router; and
upon determining the first controller and the second controller are both online, synchronizing routing delivery records between the first controller and the second controller.

7. The method according to claim 6, wherein synchronizing the routing delivery records comprises:
receiving, by one of the first controller and the second controller, a time stamp that is most recently recorded by the other one of the first controller and the second controller;
comparing the received time stamp with a newest local time stamp;
upon determining the received time stamp is later than the newest local time stamp, obtaining, from the other one of the first controller and the second controller, the routing delivery records during a period from the newest local stamp to the received time stamp; and
upon determining the received time stamp is not later than the newest local time stamp, determining that a local record is the newest.

8. The method according to claim 1, as applied to a traffic attack protection system including a splitter, the IDS, the controller, and the first border router, wherein the splitter is connected to an ISP (internet service provider) and the first border router is connected to an IDC (internet data center), the method further comprising:

copying, by the splitter, traffic from the ISP at the first traffic entrance to the IDS connected to the first border router.

9. The method according to claim 1, further comprising:
in response to obtaining the traffic cleaning request, setting, by the controller, a next-hop address as pointing to a DDoS cleaning system to carry out traffic cleaning; and
in response to obtaining the traffic blocking request, setting, by the controller, a next-hop address as pointing to a null interface to carry out traffic blocking.

10. A controller, comprising: one or more memories; and one or more processors coupled to the one or more memories, wherein the one or more processors are configured to:
establish neighbor relationships with border routers at a plurality of traffic entrances;
receive an attack protection request sent by an intrusion detection system (IDS) a first traffic entrance, the first traffic entrance being at any one of the plurality of traffic entrances, and the attack protection request carrying a target network address that has been attacked, wherein the attack protection request includes a traffic cleaning request or a traffic blocking request, and wherein the step to receive includes:
in response to determining by the IDS that traffic corresponding to the target network address is less than a preset threshold, obtaining from the IDS, by the controller, the traffic cleaning request; and
in response to determining by the IDS that the traffic corresponding to the target network address is not less than a preset threshold, obtaining from the IDS, by the controller, the traffic blocking request;
generate routing information based on the attack protection request, the routing information comprising the target network address and routing address information; and send the routing information to a first border router based on the neighbor relationship, so that the first border router performs, based on the routing address information, protection processing on the traffic that corresponds to the target network address, the first border router being a border router at the first traffic entrance at which the intrusion detection system that sends the attack protection request is located.

11. The controller according to claim 10, wherein the one or more processors are further configured to:
parse the attack protection request to obtain the target network address;
set a next-hop address that corresponds to the target network address; and
generate the routing information based on the target network address and the next-hop address, the routing information including the target network address and the next-hop address.

12. The controller according to claim 11, wherein the one or more processors are further configured to:
set the next-hop address that corresponds to the target network address based on the parsed attack protection request.

13. The controller according to claim 12, wherein the one or more processors are further configured to:
set the next-hop address as pointing to a first traffic attack processing system.

14. The controller according to claim 12, wherein the one or more processors are further configured to:
set the next-hop address as pointing to a null interface.

15. The controller according to claim 10, wherein: the controller is a controller group including at least a first controller and a second controller; each attack protection request sent from the intrusion detection system and received by the controller group further includes a time stamp;

upon determining one of the first controller and the second controller is offline, the other one of the first controller and the second controller is configured to maintain services of: receiving the attack protection request, generating the routing information, and sending the routing information to the first border router; and upon determining the first controller and the second controller are both online, the first controller and the second controller are configured to synchronize routing delivery records between the first controller and the second controller.

16. The controller according to claim 15, wherein when synchronizing the routing delivery records, one of the first controller and the second controller are further configured to:

receive a time stamp that is most recently recorded by the other one of the first controller and the second controller; compare the received time stamp with a newest local time stamp;

upon determining the received time stamp is later than the newest local time stamp, obtain, from the other one of the first controller and the second controller, the routing delivery records during a period from the newest local stamp to the received time stamp; and upon determining the received time stamp is not later than the newest local time stamp, determine that a local record is the newest.

17. A border router, comprising: one or more memories; and one or more processors coupled to the one or more memories, wherein the one or more processors are configured to:

establish a neighbor relationship with a controller, the controller having neighbor relationships with a plurality of the border routers at a plurality of traffic entrances;

receive, based on the neighbor relationship, routing information that is sent by the controller, the routing information including routing address information and a target network address that has been attacked, wherein the routing information has been generated by the controller based on an attack protection request sent by an intrusion detection system (IDS) at a first traffic entrance, the first traffic entrance being any one of the plurality of traffic entrances, and the attack protection request carrying the target network address that has been attacked, wherein the attack protection request includes a traffic cleaning request or a traffic blocking request, and wherein in response to determining by the IDS that traffic corresponding to the target network address is less than a preset threshold, the control obtains from the IDS the traffic cleaning request, and in response to determining by the IDS that the traffic corresponding to the target network address is not less than a preset threshold, the control obtains from the IDS the traffic blocking request; and perform, based on the routing information, protection processing on the traffic that corresponds to the target network address.

18. The border router according to claim 17, wherein: the routing address information includes a next-hop address that corresponds to the target network address; and the one or more processors are further configured to:

send the traffic that corresponds to the target network address to the next-hop address.

19. The border router according to claim 18, wherein: the next-hop address points to a traffic attack processing system; and the one or more processors are further configured to:

divert, based on the routing information, the traffic that corresponds to the target network address to the traffic attack processing system, so that the traffic attack processing system filters the traffic that corresponds to the target network address; and receive traffic that is filtered and returned by the traffic attack processing system.

20. The border router according to claim 18, wherein: the next-hop address points to a null interface; and the one or more processors are further configured to:

send, based on the routing information, the traffic that corresponds to the target network address to the null interface.

\* \* \* \* \*